US010623067B2

(12) United States Patent
Wang et al.

(10) Patent No.: US 10,623,067 B2
(45) Date of Patent: Apr. 14, 2020

(54) ENHANCED TIMING ADVANCE SCHEME TO SUPPORT MU-MIMO IN INTEGRATED ACCESS AND BACKHAUL

(71) Applicant: AT&T INTELLECTUAL PROPERTY I, L.P., Atlanta, GA (US)

(72) Inventors: Xiaoyi Wang, Austin, TX (US); Thomas Novlan, Austin, TX (US); Salam Akoum, Austin, TX (US); Ralf Bendlin, Cedar Park, TX (US); Milap Majmundar, Austin, TX (US); Andrew Thornburg, Austin, TX (US); Arunabha Ghosh, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 36 days.

(21) Appl. No.: 15/977,752

(22) Filed: May 11, 2018

(65) Prior Publication Data
US 2019/0349036 A1    Nov. 14, 2019

(51) Int. Cl.
*H04B 7/0452* (2017.01)
*H04L 5/00* (2006.01)
(Continued)

(52) U.S. Cl.
CPC ............. *H04B 7/0452* (2013.01); *H04B 7/14* (2013.01); *H04L 5/0048* (2013.01); *H04L 12/66* (2013.01); *H04W 72/0413* (2013.01)

(58) Field of Classification Search
CPC ............. H04W 28/20; H04W 72/0493; H04W 72/0453; H04W 16/10; H04W 16/14; H04W 88/10
See application file for complete search history.

(56) References Cited

U.S. PATENT DOCUMENTS 6,477,151 B1    11/2002 Oksala
7,979,090 B2    7/2011 Alm et al.
(Continued)

FOREIGN PATENT DOCUMENTS

KR    20090076805 A    7/2009
KR    20140066710 A    6/2014
(Continued)

OTHER PUBLICATIONS

Schaich, et al. "Relaxed synchronization support of universal filtered multi-carrier including autonomous timing advance." Wireless Communications Systems (ISWCS), 2014 11th International Symposium, IEEE, 2014.

*Primary Examiner* — Shailendra Kumar
(74) *Attorney, Agent, or Firm* — Amin, Turocy & Watson, LLP

(57) ABSTRACT

Various embodiments disclosed herein provide for an enhanced timing advance scheme to support MU-MIMO in an integrated access and backhaul system. The timing advance scheme disclosed herein aligns the arrival time between backhaul links and access links to enable MU-MIMO gain at the receiver side. In the integrated access and backhaul system, which comprises distributed nodes, the timing advance offset for an access link transmission (a transmission to a node further away in hops from the core network, or to a user equipment device) can be modified by offsetting it with the timing advance of the backhaul link (e.g., from a parent node). This enables the arrival time for transmissions, both access link transmissions from the UE or child node, and backhaul link transmissions from a parent node to arrive at the same time.

20 Claims, 10 Drawing Sheets

(51) Int. Cl.
  *H04B 7/14* (2006.01)
  *H04L 12/66* (2006.01)
  *H04W 72/04* (2009.01)

(56) References Cited

U.S. PATENT DOCUMENTS

| | | | |
|---|---|---|---|
| 8,730,854 B2 | 5/2014 | Luo et al. |
| 8,976,780 B2 | 3/2015 | Cai et al. |
| 8,989,079 B2 | 3/2015 | Park et al. |
| 9,167,597 B2 | 10/2015 | Singh et al. |
| 9,204,431 B2 | 12/2015 | Kim et al. |
| 9,281,889 B2 | 3/2016 | Kim et al. |
| 9,345,007 B2 | 5/2016 | Lee et al. |
| 9,369,247 B2 | 6/2016 | Pecen et al. |
| 9,374,203 B2 | 6/2016 | Kim et al. |
| 9,391,758 B2 | 7/2016 | Kim et al. |
| 9,473,219 B2 | 10/2016 | Muharemovic et al. |
| 9,661,612 B2 | 5/2017 | Josiam et al. |
| 9,848,445 B2 | 12/2017 | Dinan |
| 2011/0103331 A1 | 5/2011 | Kuo |
| 2012/0170570 A1 | 7/2012 | Chang et al. |
| 2012/0257569 A1 | 10/2012 | Jang et al. |
| 2013/0114572 A1 | 5/2013 | Fong et al. |
| 2014/0022974 A1 | 1/2014 | Eriksson et al. |
| 2014/0369322 A1 | 12/2014 | Fwu et al. |
| 2017/0164387 A1 | 6/2017 | Lou et al. |
| 2017/0171886 A1 | 6/2017 | Nabetani et al. |
| 2017/0302359 A1* | 10/2017 | Guo ............. H04W 56/0045 |
| 2017/0353938 A1 | 12/2017 | Nilsson et al. |
| 2019/0141755 A1* | 5/2019 | Bai ............. H04W 74/0833 |
| 2019/0159149 A1* | 5/2019 | Ryu ............. H04W 56/0045 |
| 2019/0199424 A1* | 6/2019 | Li ............. H04B 7/14 |
| 2019/0246420 A1* | 8/2019 | Park ............. H04W 72/14 |

FOREIGN PATENT DOCUMENTS

| | | |
|---|---|---|
| WO | 2015172802 A1 | 11/2015 |
| WO | 2018030872 A1 | 2/2018 |

* cited by examiner

ENHANCED TIMING ADVANCE SCHEME TO SUPPORT MU-MIMO IN INTEGRATED ACCESS AND BACKHAUL

TECHNICAL FIELD

The present application relates generally to the field of mobile communications and, more specifically, to improving timing advance alignments to support Multiple User Multiple Input Multiple Output (MU-MIMO) in an integrated access and backhaul system in a next generation wireless network.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G and other next generation network standards.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
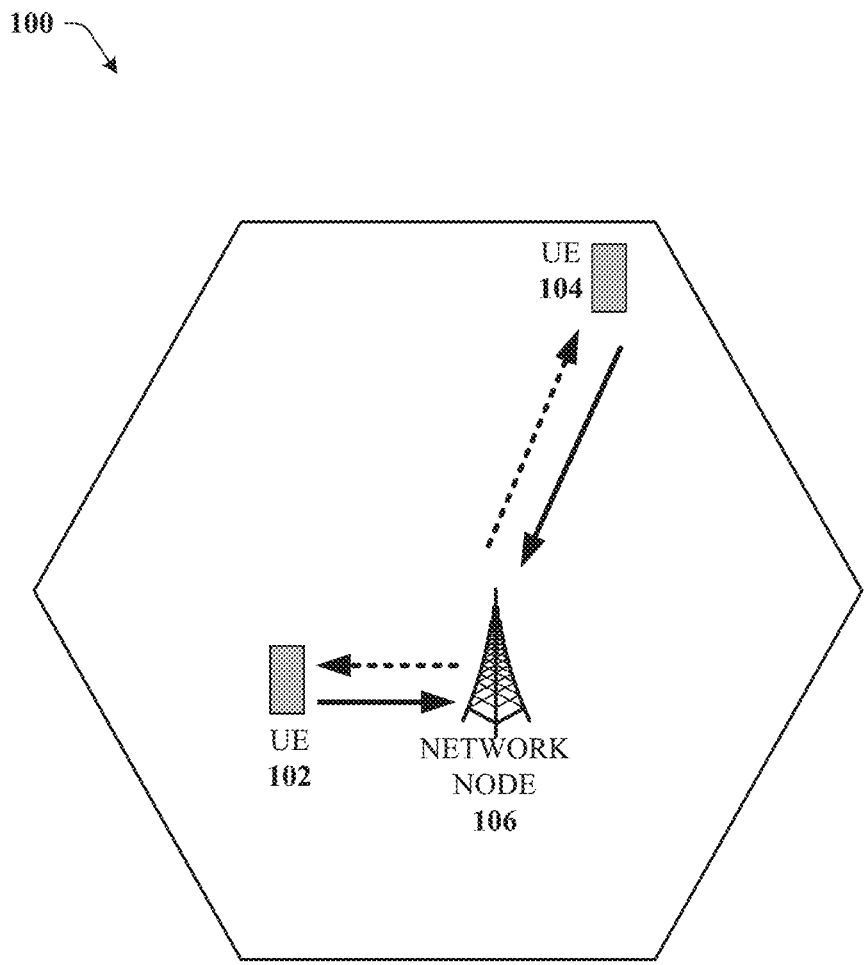
FIG. 1 illustrates an example wireless communication system in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

Various embodiments disclosed herein provide for an enhanced timing advance scheme to support MU-MIMO in an integrated access and backhaul system. The timing advance scheme disclosed herein aligns the arrival time between backhaul links and access links to enable MU-MIMO gain at the receiver side. In the integrated access and backhaul system, which comprises distributed nodes, the timing advance offset for an access link transmission (a transmission to a node further away in hops from the core network, or to a user equipment device) can be modified by offsetting it with the timing advance of the backhaul link (e.g., from a parent node). This enables the arrival time for transmissions, both access link transmissions from the UE or child node, and backhaul link transmissions from a parent node to arrive at the same time.

In various embodiments, a distributed network device can comprise a processor and a memory that stores executable instructions that, when executed by the processor facilitate performance of operations. The operations can comprise receiving a first timing advance parameter associated with a wireless backhaul link. The operations can also comprise determining a preliminary timing advance parameter associated with an access link based on a distance of an access device associated with the access link from the distributed network device. The operations can also comprise determining a second timing advance parameter to apply to a first access link transmission based on a function of the first timing advance parameters and the preliminary timing advance parameter. The operations can also comprise configuring the first access link transmission with the second timing advance parameter, such that a second access link transmission received via the access link arriving simultaneously with a backhaul link transmission received via the wireless backhaul link.

In another embodiment, method comprises calculating, by a first relay network node device comprising a processor, a timing advance alignment parameter for a first access link transmission, based on a function of a first timing advance alignment parameter associated with a backhaul transmission and a preliminary timing advance alignment parameter for the first access link transmission, wherein the preliminary timing advance alignment parameter is based on a distance of the first relay network node device from an access device associated with the first access link transmission. The method can also comprise transmitting, by the first relay network node device, the access link transmission to the access device. The method can also comprise receiving, by the first relay network node device, a second access link transmission from the access link device and the backhaul transmission at substantially the same time.

In another embodiment, a machine-readable storage medium, comprising executable instructions that, when executed by a processor of a baseband unit device, facilitate performance of operations. The operations can comprise determining a first timing advance parameter associated with a wireless backhaul link. The operations can also comprise calculating a preliminary timing advance parameter associated with an access link based on a distance of an access device associated with the access link from the distributed network device. The operations can also comprise determining a first timing advance parameter to apply to a first access link transmission based on a function of the preliminary timing advance parameter and a second timing advance parameter associated with a wireless backhaul link. The operations can also comprise configuring the first access link transmission with the first timing advance parameter, so that a second access link transmission received via the access link in response to transmitting the first access link transmission arrives simultaneously with a backhaul link transmission received via the wireless backhaul link.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

FIG. 1 illustrates an example wireless communication system 100 in accordance with various aspects and embodiments of the subject disclosure. In one or more embodiments, system 100 can comprise one or more user equipment UEs 104 and 102, which can have one or more antenna panels having vertical and horizontal elements. A UE 102 can be a mobile device such as a cellular phone, a smartphone, a tablet computer, a wearable device, a virtual reality (VR) device, a heads-up display (HUD) device, a smart car, a machine-type communication (MTC) device, and the like. UE 102 can also refer to any type of wireless device that communicates with a radio network node in a cellular or mobile communication system. Examples of UE 102 are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. User equipment UE 102 can also comprise IOT devices that communicate wirelessly. In various embodiments, system 100 is or comprises a wireless communication network serviced by one or more wireless communication network providers. In example embodiments, a UE 102 can be communicatively coupled to the wireless communication network via a network node 106.

The non-limiting term network node (or radio network node) is used herein to refer to any type of network node serving a UE 102 and UE 104 and/or connected to other network node, network element, or another network node from which the UE 102 or 104 can receive a radio signal. Network nodes can also have multiple antennas for performing various transmission operations (e.g., MIMO operations). A network node can have a cabinet and other protected enclosures, an antenna mast, and actual antennas. Network nodes can serve several cells, also called sectors, depending on the configuration and type of antenna. Examples of network nodes (e.g., network node 106) can comprise but are not limited to: NodeB devices, base station (BS) devices, access point (AP) devices, and radio access network (RAN) devices. The network node 106 can also comprise multi-standard radio (MSR) radio node devices, including but not limited to: an MSR BS, an eNode B, a network controller, a radio network controller (RNC), a base station controller (BSC), a relay, a donor node controlling relay, a base transceiver station (BTS), a transmission point, a transmission node, an RRU, an RRH, nodes in distributed antenna system (DAS), and the like. In 5G terminology, the node 106 can be referred to as a gNodeB device.

Wireless communication system 100 can employ various cellular technologies and modulation schemes to facilitate wireless radio communications between devices (e.g., the UE 102 and 104 and the network node 106). For example, system 100 can operate in accordance with a UMTS, long term evolution (LTE), high speed packet access (HSPA), code division multiple access (CDMA), time division multiple access (TDMA), frequency division multiple access (FDMA), multi-carrier code division multiple access (MC-CDMA), single-carrier code division multiple access (SC-CDMA), single-carrier FDMA (SC-FDMA), OFDM, (DFT)-spread OFDM or SC-FDMA)), FBMC, ZT DFT-s-OFDM, GFDM, UFMC, UW DFT-Spread-OFDM, UW-OFDM, CP-OFDM, resource-block-filtered OFDM, and UFMC. However, various features and functionalities of system 100 are particularly described wherein the devices (e.g., the UEs 102 and 104 and the network device 106) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs).

In an embodiment, the network node 106 can be part of an integrated access and backhaul (IAB) system comprising two or more units. This can be shown in more detail in FIG. 2. Network node 106 can perform timing advance alignment for signals to and from UE 102 and 104 as well as other network nodes in the IAB. The IAB can be a system where the user access and backhaul links are integrated with each other seamlessly using the same air interface also known as IAB. This makes it possible to dynamically share air interface resources between user access and backhaul links in response to traffic and network conditions.

Timing advance (TA) alignment is a negative offset, applied at the UE 102 or 104, between the start of a received downlink subframe and a transmitted uplink subframe. This offset at the UE is necessary to ensure that the downlink and uplink subframes are synchronized at the network node 106. A UE far from the network node 106 (e.g., UE 104) encounters a larger propagation delay so its uplink transmission is somewhat in advance as compared to UE 102 closer to the network node 102. If the TA is not applied, then the start of uplink transmission from UE 104 will overlap with the end of uplink transmission from UE 102. Assuming that same resource blocks are assigned to UE 102 and UE 104, then this overlap creates interference which causes reception failures at the network node 106. If a proper value of TA is applied, which can delay the transmission from UE 102, then these subframes won't collide. The network node 106 can configure a transmission to the UE devices that inform the UE devices of the TA, and then the UE can implement the TAs such that the uplink subframes are received at the same time.

Figure 2:
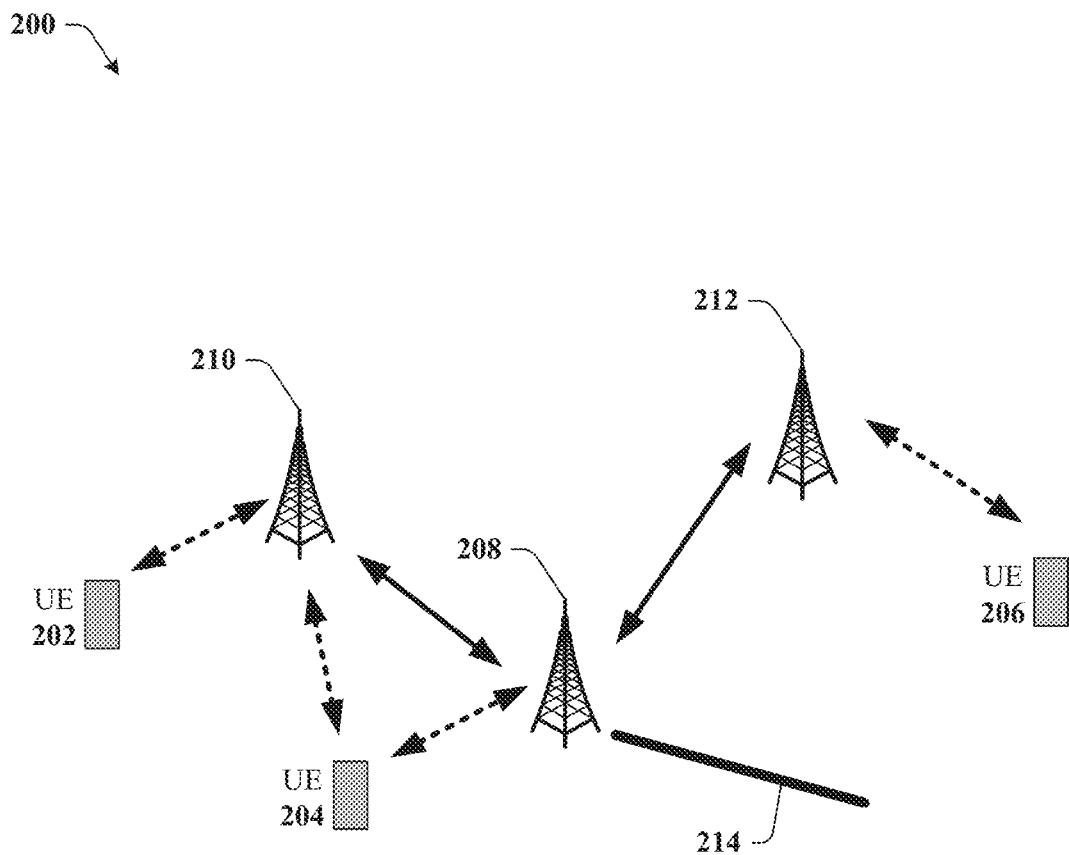
FIG. 2 illustrates an example block diagram showing an integrated access and backhaul system in accordance with various aspects and embodiments of the subject disclosure.

Turning now to FIG. 2, illustrated is an example block diagram 200 showing an integrated access and backhaul system in accordance with various aspects and embodiments of the subject disclosure. In an example embodiment of an IAB shown in FIG. 2, a donor node 208 is connected to two IAB nodes 210 and 212 via backhaul links and all the nodes can be connected to UE 202, 204, and 206 via access links. The IAB nodes 210 and 212 relay user traffic over one or more hops from the UE to the Donor node 208 which has a wired transport connection 214 to the core network (not shown).

In an embodiment, an access link can refer to a wireless link between a IAB or relay node and a user equipment device, or to another relay node that is topographically further away from the core network. A backhaul link can refer to a link from a child node to a parent node or from a relay node (e.g., 210 or 212) to the donor node (208).

Further, the IAB node (e.g., node 210 or 212) can comprise a distributed unit function (DU) which transmits/receives user traffic or relay traffic from other IAB nodes at higher order hops via an access link and a mobile termination (MT) function which transmits/receives relay traffic from a parent IAB node (e.g. other IAB nodes or donor node 208) via a backhaul link.

In an embodiment, the IAB nodes can be equipped with advanced antenna panels. With advanced MIMO processing capability, it is natural to utilize spatial domain to separate backhaul and access link. With good interference mitigation technology, spatial domain separated backhaul and access link can ensure the maximal amount of radio resource available to the user.

In one example, the simultaneous reception (Rx) at the IAB node 210 utilizes the same receive beam/antenna panel and is based on MU-MIMO transmissions between the access link and backhaul link with joint physical layer processing for the IAB node DU and IAB node MT. In another example the simultaneous Rx at the IAB node utilizes different receive beams/antenna panels and is based on spatial division multiplexing of the access and backhaul links with separate joint physical layer processing for the IAB node DU and IAB node MT. Traditional synchronization scheme focuses on align the timing on the downlink transmission, e.g. LTE TDD base-station synchronization requirement is 3 us along the downlink symbol. In uplink, timing advance is applied to compensate the different propagation delay cause by the different distance of users. The principle is to make sure the Physical Uplink Shared Channel (PUSCH) arrival time are 1) aligned between all user's PUSCH. 2) aligned the PUSCH arrival time with the downlink subframe boundary to avoid collision with downlink transmission.

Since both the backhaul link and the access links are wireless transmission links, timing advance alignments should be performed between these links as well, and not only between the final relay node and the UE devices. Therefore, this disclosure provides an enhanced TA procedure to align the arrival time between backhaul links and access links to enable MU-MIMO gain at receiver side. The principle, different from regular timing advance scheme, is to apply the TA offset obtained from parent relay nodes to the TA configuration for the child relay node 210 and access UEs 202 and 204. In an embodiment, the actual TA to be configured to child relay node 210 or access UEs 202 and 204 should use the following formula: TA=TA_access−TA_parents. Where TA_access is the timing advance based on the distance between UE 202 and network node 210 or child relay nodes and the current relay nodes. And the TA_parents is the timing advanced configured from parent nodes 208. Since TA_parents is one single value, effectively, the TAs for all child relay links and UE are offset accordingly.

Figure 3:
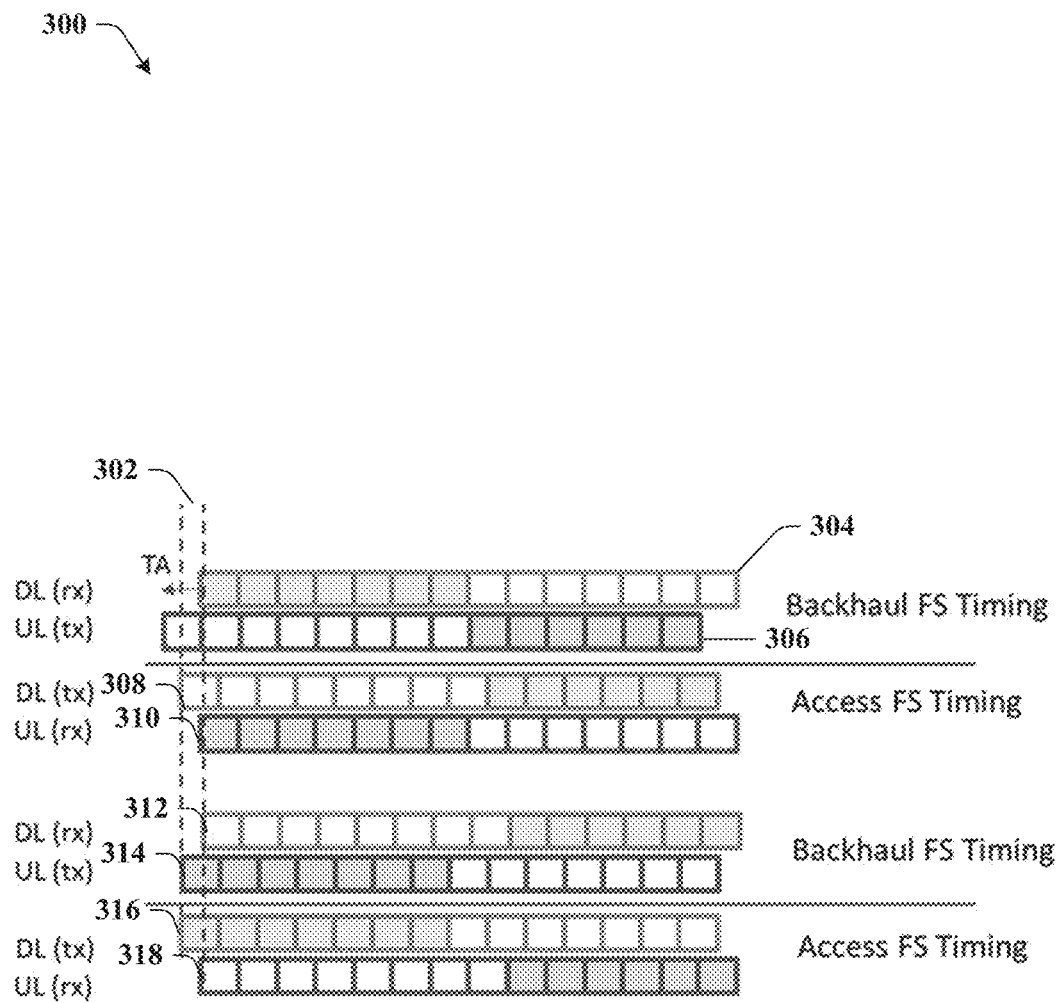
FIG. 3 illustrates an example block diagram showing timing advance alignments for backhaul and access link transmissions in accordance with various aspects and embodiments of the subject disclosure.

Turning now to FIG. 3, illustrated is an example block diagram 300 showing timing advance alignments for backhaul and access link transmissions in accordance with various aspects and embodiments of the subject disclosure.

In FIG. 3, the timing advance adjustment 302 can be applied to various downlink and uplink transmissions. For instance, a network node (e.g., network node 210) can transmit an uplink (Tx) 306 transmission to a parent node and receive back downlink (Rx) 304 transmission from the parent node that has a TA 302 applied which matches the time that access link uplink transmission 310 received from a child node or UE device is received in response to sending an access link downlink transmission 308 to the child node or UE device. Since the uplink transmission 310 is received at the same time as the downlink transmission 304 there is no collision and the uplink transmission 310 and downlink transmission 304 can be processed in parallel or jointly depending on the type of transmission.

Similarly, network node (e.g., network node 210) can transmit an uplink(Tx) 314 transmission to a parent node and receive back downlink (Rx) 312 transmission from the parent node that has a TA 302 applied which matches the time that access link uplink transmission 318 received from a child node or UE device is received in response to sending an access link downlink transmission 316 to the child node or UE device. Since the uplink transmission 318 is received at the same time as the downlink transmission 312 there is no collision and the uplink transmission 318 and downlink transmission 312 can be processed in parallel or jointly depending on the type of transmission.

Figure 4:
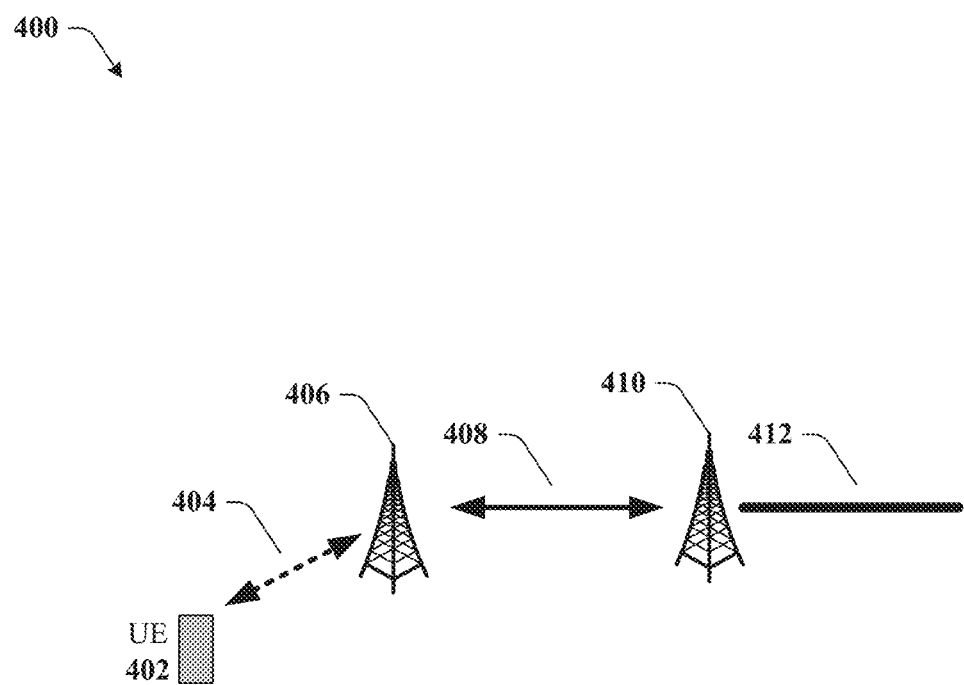
FIG. 4 illustrates an example block diagram showing an integrated access and backhaul system in accordance with various aspects and embodiments of the subject disclosure.

Turning now to FIG. 4, illustrated is an example block diagram 400 showing an integrated access and backhaul system in accordance with various aspects and embodiments of the subject disclosure.

In an embodiment, the donor node 410 or node closest to the core network can have a fiber optic or other wired connection 412 to the core network, and then communicate via a backhaul connection 408 with a distributed network device or relay node 406 which is connected via an access link 404 to UE 402.

In an embodiment, a MU-MIMO transmission at relay node 406 may involve a UL PUSCH transmission from the UE 402 on the access link 404 and a DL. PDSCH transmission from the donor node 410 on the backhaul link 408. If the simultaneous reception of the UL transmission and DL transmission utilize different beams/panels, they can be independently processed with parallel protocol stacks (e.g. PHY/MAC/RLC/PDCP) at the IAB node DU and MT functions respectively. In addition, the UL PUSCH transmission and DL PDSCH transmission can be independently scheduled by the IAB node and a different IAB node/donor node respectively.

In another embodiment, the DL PDSCH transmission from the donor node 410 may be based on a PUSCH transmission structure (e.g. downlink PUSCH) including the demodulation reference signal (DMRS), resource element (RE) mapping, and transport block (TB) processing all following the PUSCH procedure. In this case the simultaneous reception of the UL transmission and DL transmission utilize the same or different beams/panels, and can be jointly processed with a common physical layer and parallel higher layer protocol stacks (e.g. MAC/RLC/PDCP) at the IAB node DU and MT functions respectively. In this case the TBs corresponding to the DL PDSCH and UL PUSCH can be mapped to different logical channels at the IAB node DU and IAB node MT respectively.

Figure 5:
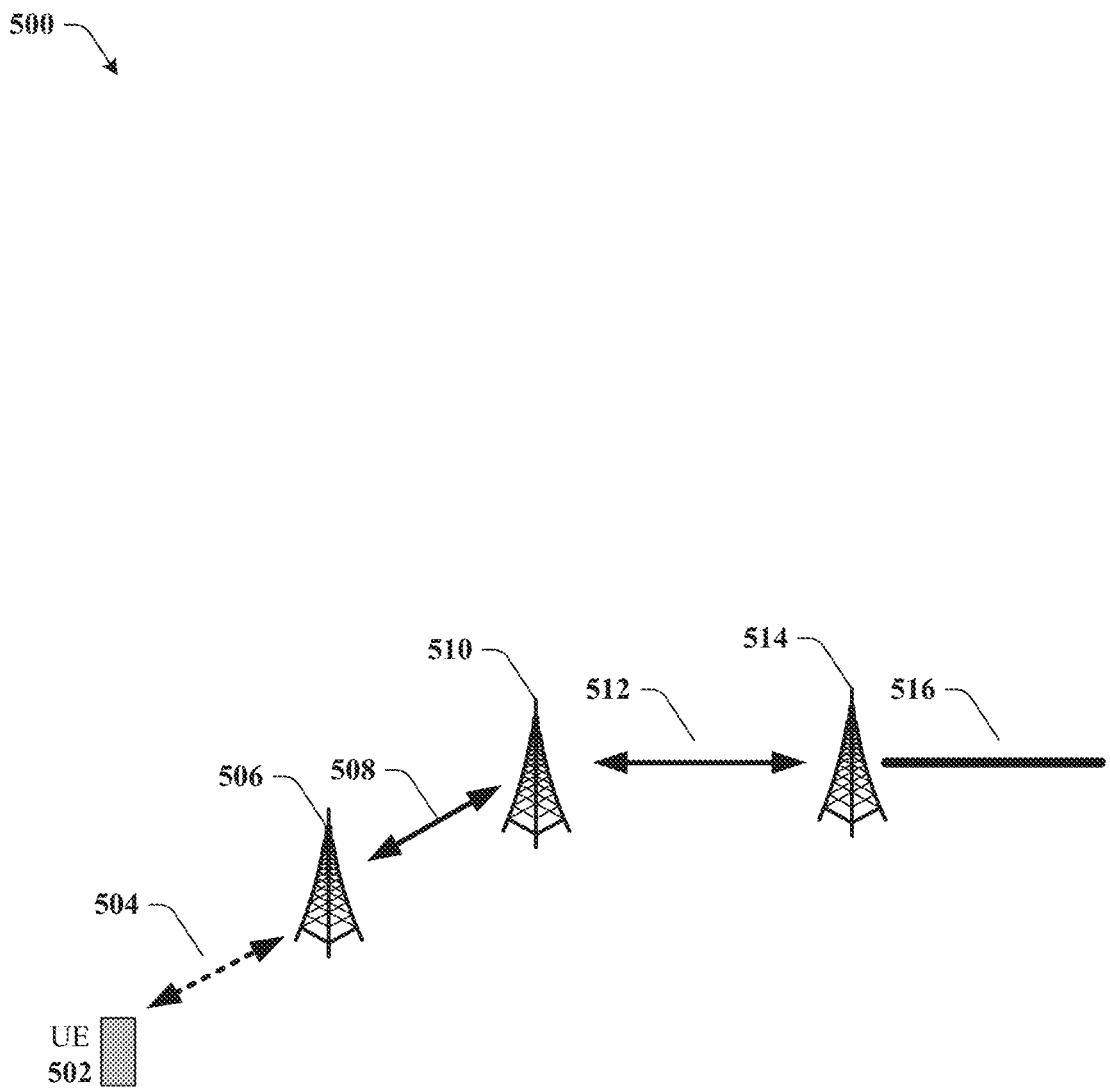
FIG. 5 illustrates an example block diagram showing an integrated access and backhaul system in accordance with various aspects and embodiments of the subject disclosure.

Turning now to FIG. 5, illustrated is an example block diagram 500 showing an integrated access and backhaul system in accordance with various aspects and embodiments of the subject disclosure.

The embodiment in FIG. 5 is similar to that of FIG. 4, but in this embodiment, there can be an extra relay node 510. The UE 502 can connect to the relay node 506 over an access link 504, and relay node 506 can connect to the relay node 510 over access/backhaul link 508 (depending on whether the transmissions are going to or from the core network). The relay node 510 can then connect to donor node 514 over backhaul link 512, where the donor node 514 is connected to the core network via wired backhaul line 516. The DL PDSCH transmissions from the donor node 514 and or 510 can be based on PUSCH transmission protocol as described above in FIG. 4.

Figure 6:
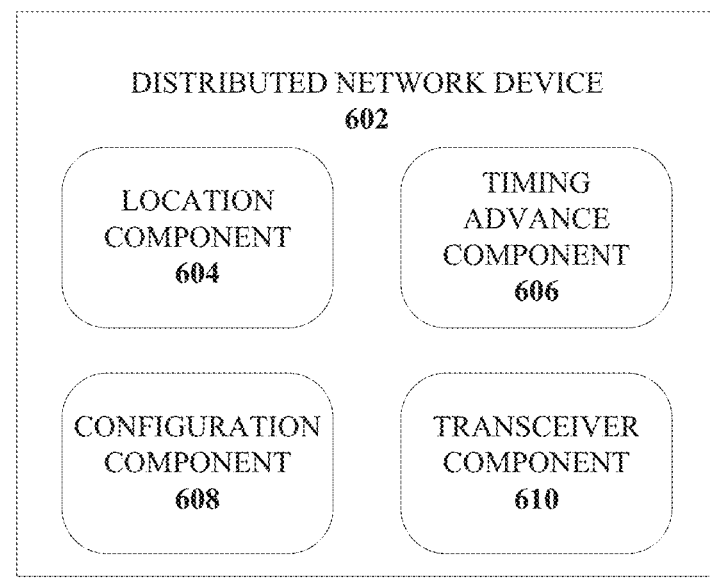
FIG. 6 illustrates an example distributed network device in accordance with various aspects and embodiments of the subject disclosure.

Turning now to FIG. 6, illustrated is block diagram 600 of an example distributed network device 602 in accordance with various aspects and embodiments of the subject disclosure.

A location component 604 can determine a location of a relay node on an access link or a user equipment device relative to the distributed network device 602 in order to calculate a distance. Based on the distance, the timing advance component 606 can determine a preliminary TA offset for the access link device. The transceiver component 608 can receive an RRC configuration transmission from a donor node which informs the distributed network device 602 of the TA off set from the parent node, and then the timing advance component 606 can use the parent node TA to adjust the preliminary TA offset for the access link device. The configuration component 608 can configure instructions for the access link device to apply the TA offset determined by the timing advance component 606 such that a uplink transmission received from the access link device is received by the transceiver component 610 at substantially the same time (such that the transmission received are able to be processed at the same time in the same or parallel pipeline) as a downlink transmission received from a donor node.

Figure 7:
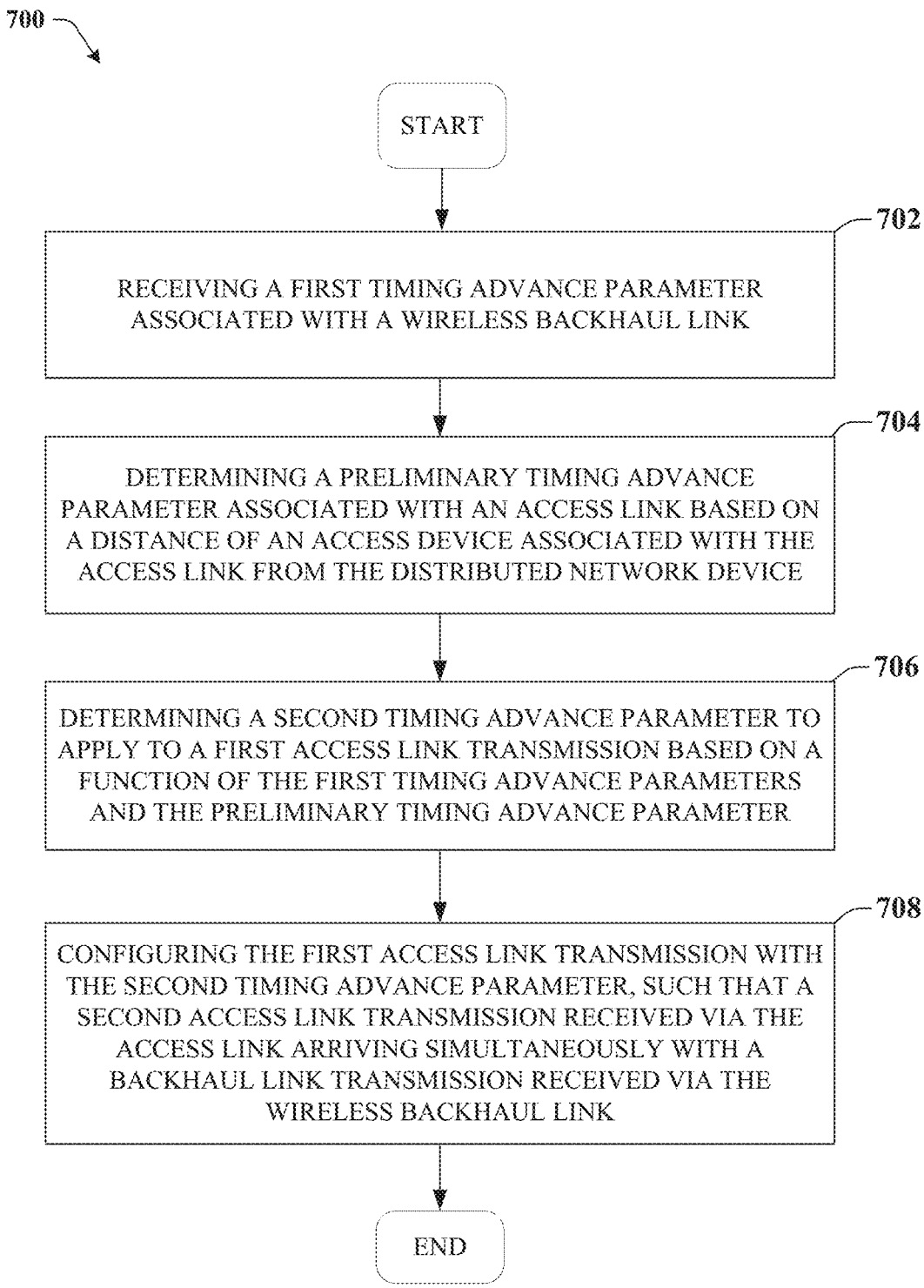
FIG. 7 illustrates an example method for performing timing advance alignments in an integrated access and backhaul system in accordance with various aspects and embodiments of the subject disclosure.
Figure 8:
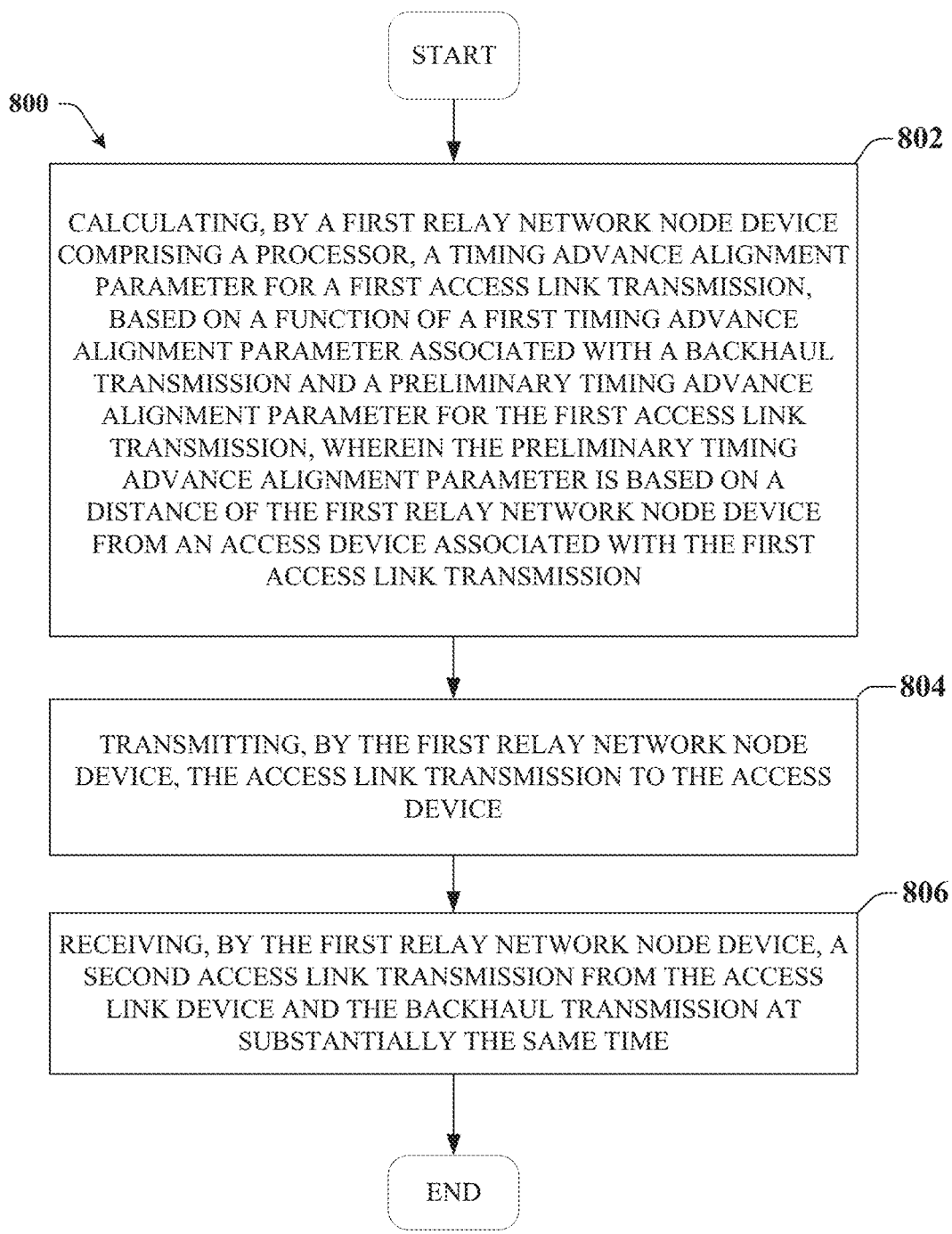
FIG. 8 illustrates an example method for performing timing advance alignments in an integrated access and backhaul system in accordance with various aspects and embodiments of the subject disclosure.

FIGS. 7-8 illustrates a process in connection with the aforementioned systems. The processes in FIGS. 7-8 can be implemented for example by the systems in FIGS. 1-5 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 7 illustrates example method 700 for performing timing advance alignments in an integrated access and backhaul system in accordance with various aspects and embodiments of the subject disclosure.

Method 700 can begin at 702 where the method includes receiving a first timing advance parameter associated with a wireless backhaul link.

At 704, the method includes determining a preliminary timing advance parameter associated with an access link based on a distance of an access device associated with the access link from the distributed network device.

At 706, the method includes determining a second timing advance parameter to apply to a first access link transmission as a function of the first timing advance parameter and the preliminary timing advance parameter.

At 708, the method includes configuring the first access link transmission with the second timing advance parameter, as a result of which a second access link transmission is received via the access link arriving concurrently with a backhaul link transmission received via the wireless backhaul link.

FIG. 8 illustrates an example method 800 for performing timing advance alignments in an integrated access and backhaul system in accordance with various aspects and embodiments of the subject disclosure.

Method 800 can begin at 802 wherein the method includes calculating, by a first relay network node device comprising a processor, a timing advance alignment parameter for a first access link transmission, based on a first timing advance alignment parameter associated with a backhaul transmission and a preliminary timing advance alignment parameter for the first access link transmission, wherein the preliminary timing advance alignment parameter is based on a distance of the first relay network node device from an access device associated with the first access link transmission.

At 804, the method can include facilitating, by the first relay network node device, transmitting the access link transmission to the access device.

At 806, the method can include facilitating, by the first relay network node device, receiving a second access link transmission from the access link device and the backhaul transmission at substantially a same time.

Figure 9:
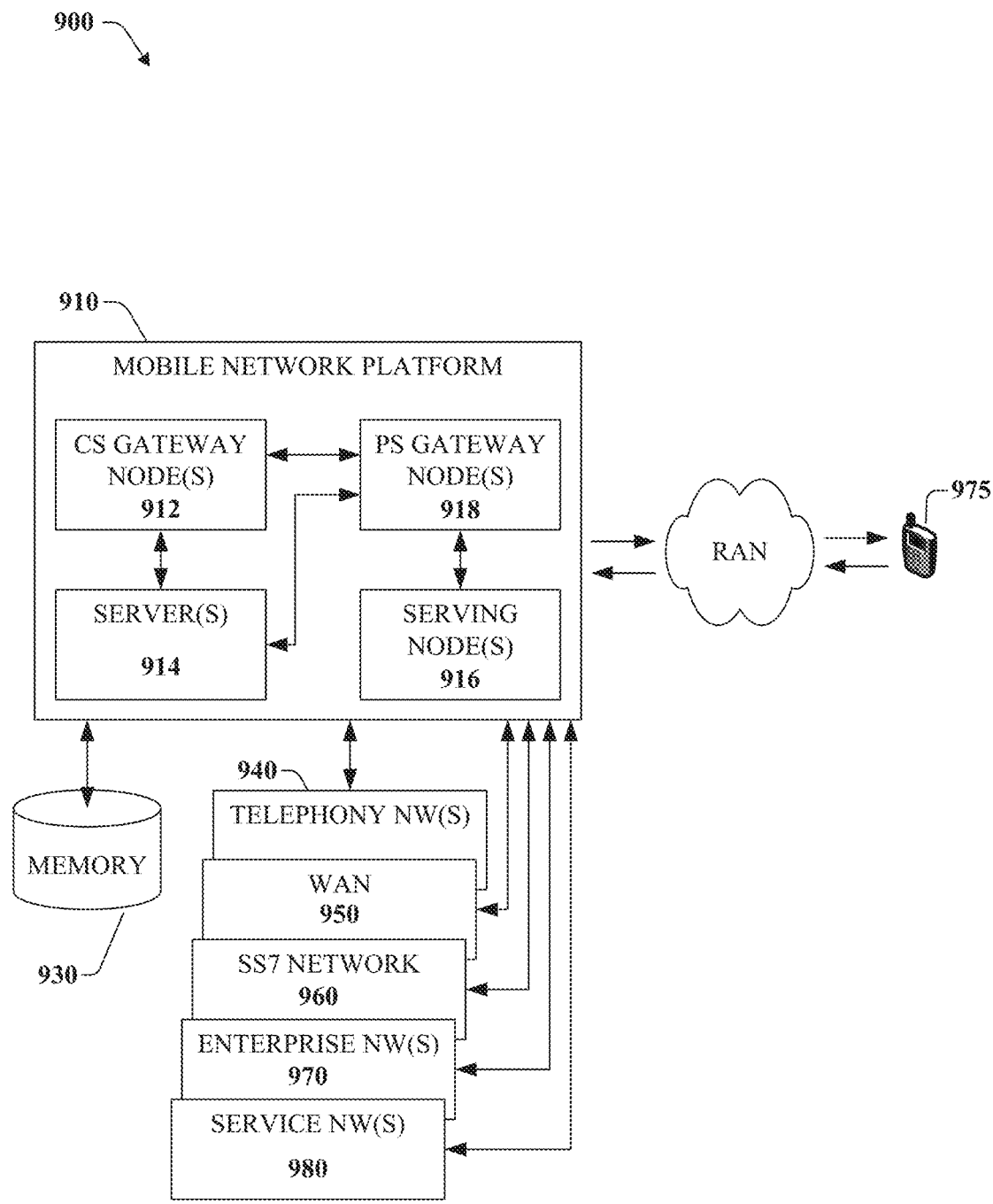
FIG. 9 illustrates an example block diagram of a non-limiting embodiment of a mobile network platform in accordance with various aspects described herein.

FIG. 9 presents an example embodiment 900 of a mobile network platform 910 that can implement and exploit one or more aspects of the disclosed subject matter described herein. Generally, wireless network platform 910 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 910 can be included in telecommunications carrier networks, and can be considered carrier-side components as discussed elsewhere herein. Mobile network platform 910 includes CS gateway node(s) 912 which can interface CS traffic received from legacy networks like telephony network(s) 940 (e.g., public switched telephone network (PSTN), or public land mobile network (PLMN)) or a signaling system #7 (SS7) network 970. Circuit switched gateway node(s) 912 can authorize and authenticate traffic (e.g., voice) arising from such networks. Additionally, CS gateway node(s) 912 can access mobility, or roaming, data generated through SS7 network 970; for instance, mobility data stored in a visited location register (VLR), which can reside in memory 930. Moreover, CS gateway node(s) 912 interfaces CS-based traffic and signaling and PS gateway node(s) 918. As an example, in a 3GPP UMTS network, CS gateway node(s) 912 can be realized at least in part in gateway GPRS support node(s) (GGSN). It should be appreciated that functionality and specific operation of CS gateway node(s) 912, PS gateway node(s) 918, and serving node(s) 916, is provided and dictated by radio technology(ies) utilized by mobile network platform 910 for telecommunication. Mobile network platform 910 can also include the MMEs, HSS/PCRFs, SGWs, and PGWs disclosed herein.

In addition to receiving and processing CS-switched traffic and signaling, PS gateway node(s) 918 can authorize and authenticate PS-based data sessions with served mobile devices. Data sessions can include traffic, or content(s), exchanged with networks external to the wireless network platform 910, like wide area network(s) (WANs) 950, enterprise network(s) 970, and service network(s) 980, which can be embodied in local area network(s) (LANs), can also be interfaced with mobile network platform 910 through PS gateway node(s) 918. It is to be noted that WANs 950 and enterprise network(s) 960 can embody, at least in part, a service network(s) like IP multimedia subsystem (IMS). Based on radio technology layer(s) available in technology resource(s) 917, packet-switched gateway node(s) 918 can generate packet data protocol contexts when a data session is established; other data structures that facilitate routing of packetized data also can be generated. To that end, in an aspect, PS gateway node(s) 918 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 900, wireless network platform 910 also includes serving node(s) 916 that, based upon available radio technology layer(s) within technology resource(s) 917, convey the various packetized flows of data streams received through PS gateway node(s) 918. It is to be noted that for technology resource(s) 917 that rely primarily on CS communication, server node(s) can deliver traffic without reliance on PS gateway node(s) 918; for example, server node(s) can embody at least in part a mobile switching center. As an example, in a 3GPP UMTS network, serving node(s) 916 can be embodied in serving GPRS support node(s) (SGSN).

For radio technologies that exploit packetized communication, server(s) 914 in wireless network platform 910 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 910. Data streams (e.g., content(s) that are part of a voice call or data session) can be conveyed to PS gateway node(s) 918 for authorization/authentication and initiation of a data session, and to serving node(s) 916 for communication thereafter. In addition to application server, server(s) 914 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 910 to ensure network's operation and data integrity in addition to authorization and authentication procedures that CS gateway node(s) 912 and PS gateway node(s) 918 can enact. Moreover, provisioning server(s) can provision services from external network(s) like networks operated by a disparate service provider; for instance, WAN 950 or Global Positioning System (GPS) network(s) (not shown). Provisioning server(s) can also provision coverage through networks associated to wireless network platform 910 (e.g., deployed and operated by the same service provider), such as femto-cell network(s) (not shown) that enhance wireless service coverage within indoor confined spaces and offload RAN resources in order to enhance subscriber service experience within a home or business environment by way of UE 975.

It is to be noted that server(s) 914 can include one or more processors configured to confer at least in part the functionality of macro network platform 910. To that end, the one or more processor can execute code instructions stored in memory 930, for example. It is should be appreciated that server(s) 914 can include a content manager 915, which operates in substantially the same manner as described hereinbefore.

In example embodiment 900, memory 930 can store information related to operation of wireless network platform 910. Other operational information can include provisioning information of mobile devices served through wireless platform network 910, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 930 can also store information from at least one of telephony network(s) 940, WAN 950, enterprise network(s) 960, or SS7 network 970. In an aspect, memory 930 can be, for example, accessed as part of a data store component or as a remotely connected memory store.

Figure 10:
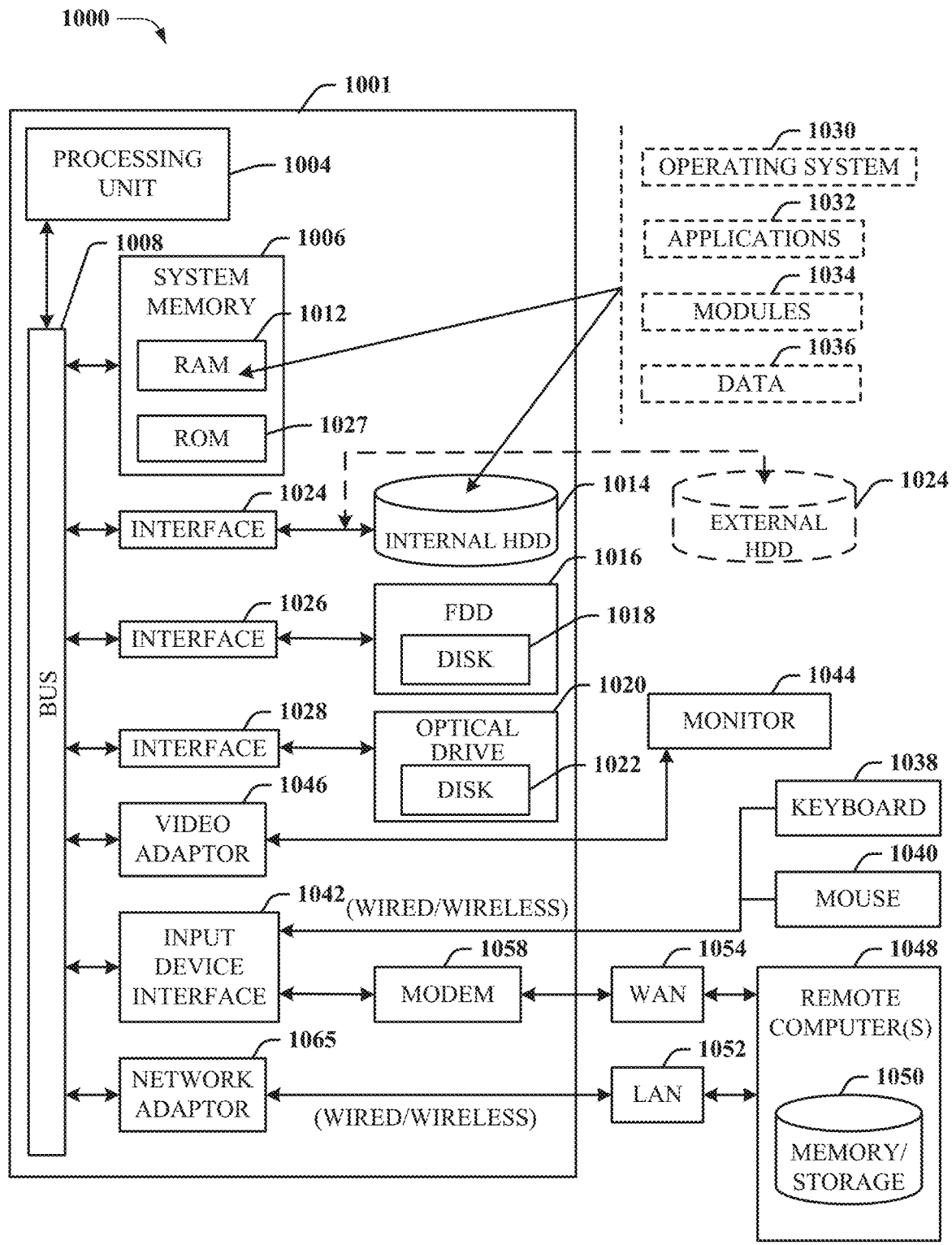
FIG. 10 illustrates an example block diagram of a computer that can be operable to execute processes and methods in accordance with various aspects and embodiments of the subject disclosure.

Referring now to FIG. 10, there is illustrated a block diagram of a computer 1000 operable to execute the functions and operations performed in the described example embodiments. For example, a network node (e.g., network node 106, network node 206, e.g.) or mobile edge computing device 108, 208, etc., may contain components as described in FIG. 10. The computer 1000 can provide networking and communication capabilities between a wired or wireless communication network and a server and/or communication device. In order to provide additional context for various aspects thereof, FIG. 10 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Referring now to FIG. 10, there is illustrated a block diagram of a computer 1000 operable to execute the functions and operations performed in the described example embodiments. For example, a network node (e.g., network node 106, gNB 202, e.g.) may contain components as described in FIG. 10. The computer 1000 can provide networking and communication capabilities between a wired or wireless communication network and a server and/or communication device. In order to provide additional context for various aspects thereof, FIG. 10 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject embodiments.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the various embodiments can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1000 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infra-red and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A distributed network device, comprising:
a processor; and
a memory that stores executable instructions that, when executed by the processor, facilitate performance of operations, comprising:
receiving a first timing advance parameter associated with a wireless backhaul link;
determining a preliminary timing advance parameter associated with an access link based on a distance of an access device associated with the access link from the distributed network device;
determining a second timing advance parameter to apply to a first access link transmission based on subtracting the first timing advance parameter from the preliminary timing advance parameter; and
configuring the first access link transmission with the second timing advance parameter, as a result of which a second access link transmission is received via the access link arriving concurrently with a backhaul link transmission received via the wireless backhaul link.

2. The distributed network device of claim 1, wherein the operations further comprise:
receiving the backhaul link transmission on a physical downlink shared channel.

3. The distributed network device of claim 2, wherein the operations further comprise:
processing the backhaul link transmission and the second access link transmission with a common physical layer stack and separate protocol stacks.

4. The distributed network device of claim 3, wherein the operations further comprise:
mapping a first transport block associated with the backhaul link transmission and a second transport block associated with the second access link transmission to a first logical channel and a second logical channel, respectively.

5. The distributed network device of claim 1, wherein the operations further comprise:
receiving the backhaul link transmission via a physical downlink shared channel.

6. The distributed network device of claim 5, wherein the operations further comprise:
processing the backhaul link transmission and the second access link transmission with separate physical layer stacks and separate protocol stacks.

7. The distributed network device of claim 6, wherein the operations further comprise:
receiving the backhaul link transmission and the second access link transmission via separate antenna elements.

8. The distributed network device of claim 1, wherein the access link device is a user equipment device.

9. The distributed network device of claim 1, wherein the access link device is a distributed network relay device.

10. The distributed network device of claim 1, wherein the distributed network device is a node device of an integrated access and backhaul network.

11. A method, comprising:
calculating, by a first relay network node device comprising a processor, a timing advance alignment parameter for a first access link transmission, based on subtracting a first timing advance alignment parameter associated with a backhaul transmission from a preliminary timing advance alignment parameter for the first access link transmission, wherein the preliminary timing advance alignment parameter is based on a distance of the first relay network node device from an access device associated with the first access link transmission;
facilitating, by the first relay network node device, transmitting the access link transmission to the access device; and
facilitating, by the first relay network node device, receiving a second access link transmission from the access link device and the backhaul transmission at substantially a same time.

12. The method of claim 11, further comprising:
receiving, by the first relay network node device, the backhaul transmission on a physical downlink shared channel; and processing, by the first relay network node device, the backhaul transmission and the second access link transmission with a common physical layer stack and separate protocol stacks.

13. The method of claim 12, further comprising:
mapping, by the first relay network node device, a first transport block associated with the backhaul transmission and a second transport block associated with the second access link transmission to a first logical channel and a second logical channel, respectively.

14. The method of claim 11, further comprising:
facilitating, by the first relay network node device, receiving the backhaul transmission on a physical downlink shared channel; and
processing, by the first relay network node device, the backhaul transmission and the second access link transmission with separate physical layer stacks and separate protocol stacks.

15. The method of claim 14, further comprising:
receiving, by the first relay network node device, the backhaul link transmission and the second access link transmission via separate antenna elements.

16. The method of claim 11, wherein the access device is a distributed network relay device.

17. The method of claim 11, wherein the distributed network device is a node device of an integrated access and backhaul network.

18. A machine-readable storage medium, comprising executable instructions that, when executed by a processor of a baseband unit device, facilitate performance of operations, comprising:
determining a first timing advance parameter associated with a wireless backhaul link;
calculating a preliminary timing advance parameter associated with an access link based on a distance of an access device associated with the access link from a distributed network device;
determining a second timing advance parameter to apply to a first access link transmission based on subtracting the first timing advance parameter from the preliminary timing advance parameter; and
configuring the first access link transmission with the second timing advance parameter, comprising causing a second access link transmission received via the access link in response to transmitting the first access link transmission to arrive simultaneously with a backhaul link transmission received via the wireless backhaul link.

19. The machine-readable storage medium of claim 18, wherein the operations further comprise:
receiving the backhaul link transmission via a physical downlink shared channel; and
processing the backhaul link transmission and the second access link transmission with a common physical layer stack and separate protocol stacks.

20. The machine-readable storage medium of claim 18, wherein the operations further comprise:
mapping a first transport block associated with the backhaul link transmission and a second transport block associated with the second access link transmission to a first logical channel and a second logical channel, respectively.

* * * * *